Jan. 5, 1954         L. ARMSTRONG ET AL         2,664,833
           MACHINE FOR FORMING AND PACKING BLANKS OF DOUGH
Filed Feb. 10, 1950                              5 Sheets-Sheet 2
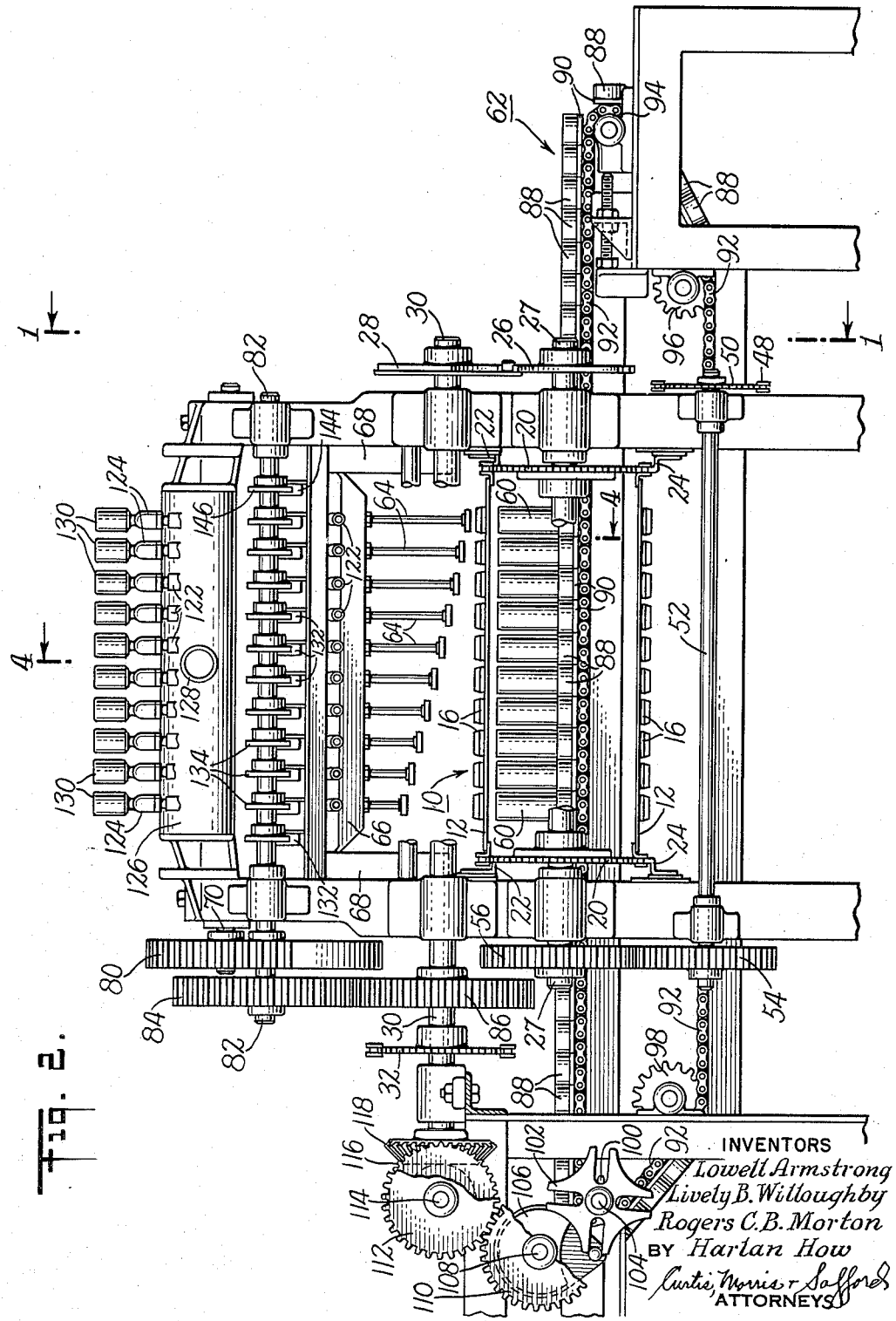
INVENTORS
Lowell Armstrong
Lively B. Willoughby
Rogers C. B. Morton
BY Harlan How
Curtis, Morris & Safford
ATTORNEYS Jan. 5, 1954 L. ARMSTRONG ET AL 2,664,833
MACHINE FOR FORMING AND PACKING BLANKS OF DOUGH
Filed Feb. 10, 1950 5 Sheets-Sheet 3
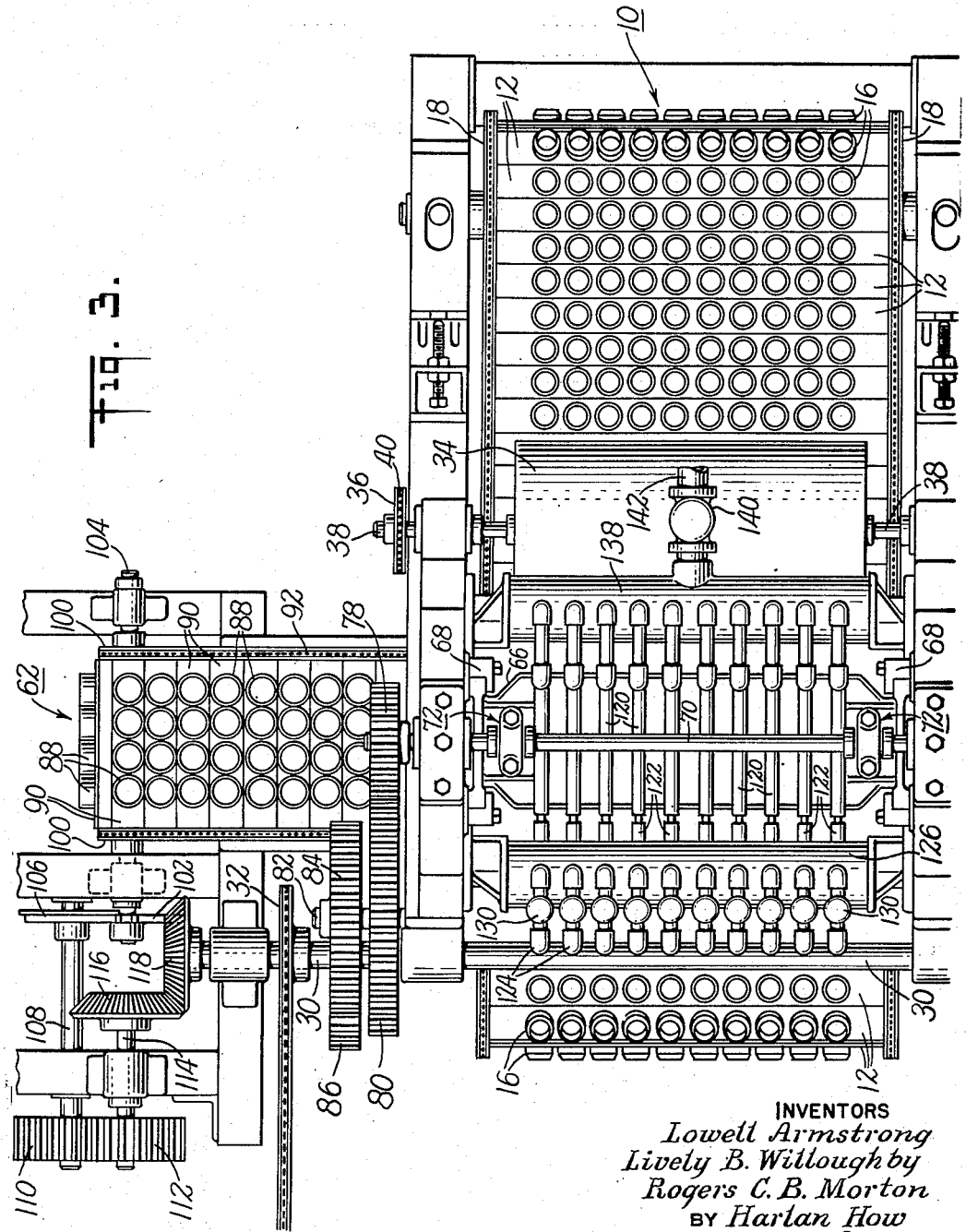
INVENTORS
Lowell Armstrong
Lively B. Willoughby
Rogers C. B. Morton
BY Harlan How
Curtis, Morris & Safford
ATTORNEYS

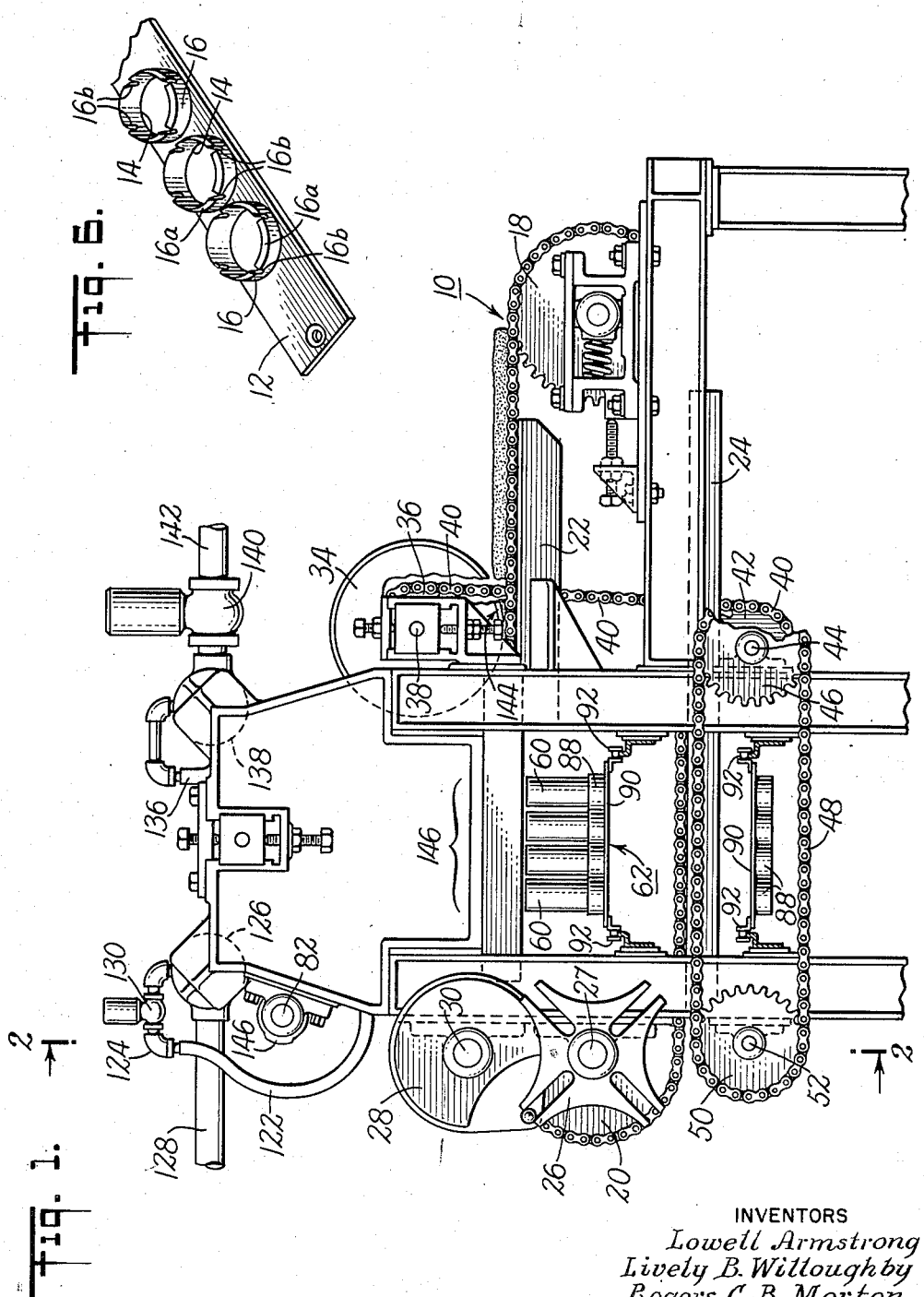

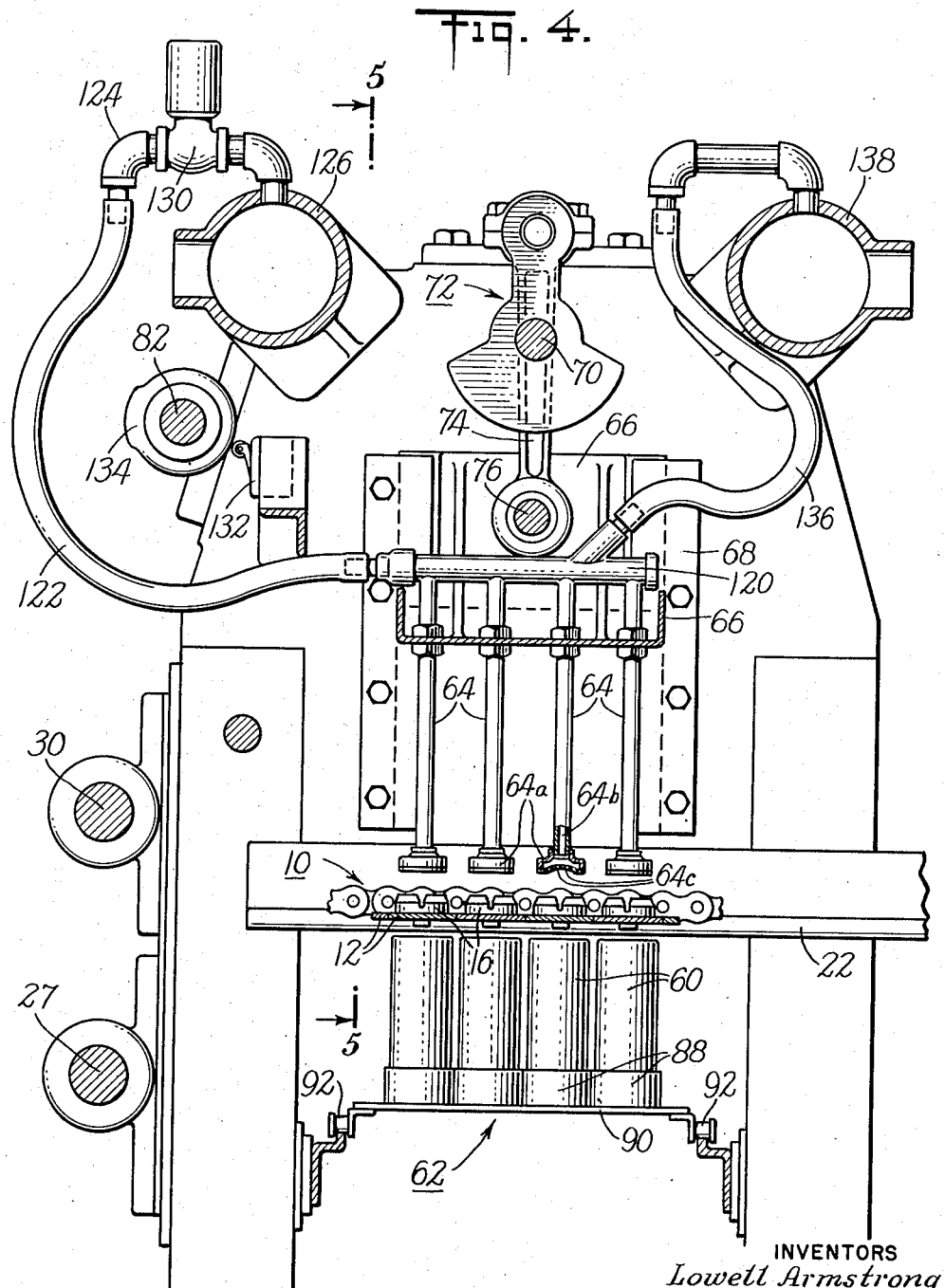

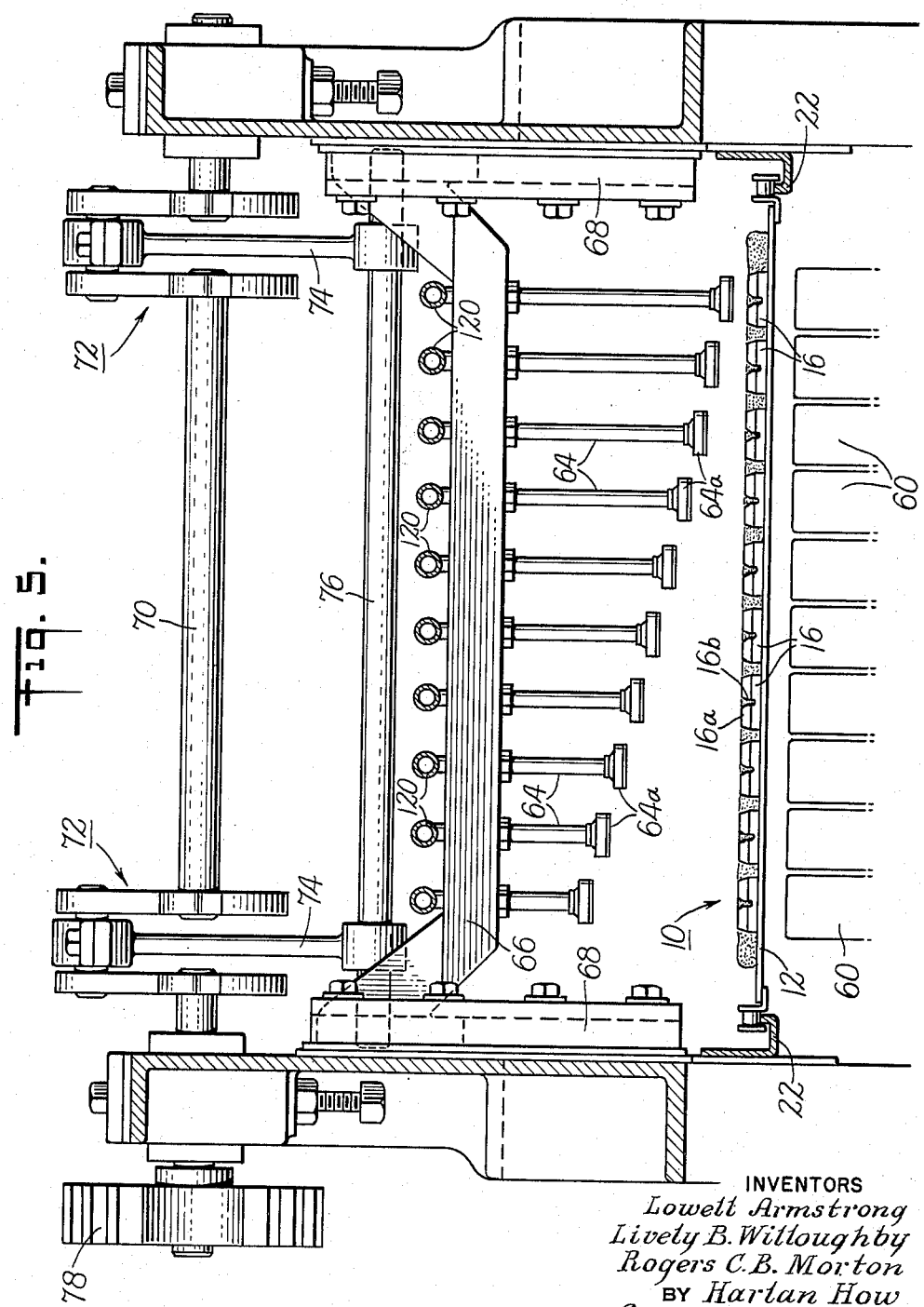

Patented Jan. 5, 1954

2,664,833

UNITED STATES PATENT OFFICE 2,664,833

MACHINE FOR FORMING AND PACKING BLANKS OF DOUGH

Lowell Armstrong and Lively B. Willoughby, Louisville, Rogers C. B. Morton, Prospect, and Harlan How, Louisville, Ky., assignors, by mesne assignments, to Pillsbury Mills, Inc., a corporation of Delaware Application February 10, 1950, Serial No. 143,428

12 Claims. (Cl. 107—6)

This invention relates to machines for forming and packing blanks of dough, particularly blanks of prepared dough such as the prepared biscuits, which have heretofore been packaged for transportation under refrigeration and ultimate sale to housewives and others in a ready-to-bake condition.

The present invention provides a machine for cutting circular blanks of dough such as biscuit blanks from a continuous sheet of dough and packing these blanks in tubular cans. The particular machine shown and described includes a dough carrier, in the form of an endless roller chain belt, bearing a plurality of open tubular cutter elements and a cylindrical roller engaging the cutting edges of the cutter elements to press a sheet of dough on said carrier onto the cutter elements and form within them circular biscuit blanks. The cutter belt then carries the biscuit blanks over one or more rows of cans which are positioned beneath the cutter belt on a laterally extending conveyor. A plurality of plungers above and across the cutter belt are arranged to reciprocate through the cutters to press the biscuit blanks downwardly into the cans. Means are provided for retaining the biscuit blanks in the open tubular cutters during the travel of the cutter belt from the point at which the roller is in contact with the cutter belt to form biscuit blanks within the cutters and the point at which the plungers transfer the blanks from the cutter belt to the cans.

In order to hold the biscuit blanks against the ends of the plungers during the downward movement of the plungers, a source of pneumatic vacuum is connected to the plungers during their downward movement; and in order to free the biscuit blanks from the plungers when the plungers reach their lower extreme of movement, a source of pneumatic pressure is connected to the plungers to "blow" the blanks off of the ends of the plungers.

After each cycle of reciprocation of the plungers the cutter belt is indexed forward to bring a new supply of biscuit blanks into position for transfer to the cans, and the can conveyor is indexed laterally of the cutter belt a distance equal to the spacing between successive cans, so that each can, in its course across the machine, receives a number of biscuit blanks equal to the number of cutters in a transverse row on the cutter belt. The plungers are of graduated lengths so that as the cans move across the machine and are filled with biscuit blanks, the plungers carry the biscuit blanks to successively higher positions within the cans.

In the drawings:

Figure 1 is a side elevation of a machine embodying features of the present invention, with the machine shown broken away along the line 1—1 of Figure 2;

Figure 2 is an end elevation of said machine, with the machine shown broken away along the line 2—2 of Figure 1 and with certain other parts being shown broken away to reveal the internal structure of the machine;

Figure 3 is a top plan view of the machine;

Figure 4 is a vertical section taken generally along the broken line 4—4 of Figure 2;

Figure 5 is a vertical section taken generally along the line 5—5 of Figure 4; and Figure 6 is a fragmentary perspective view of one of the bars which form the cutter belt of the machine.

As shown in Figure 1, the machine includes a cutter belt generally indicated at 10 and comprising a pair of roller chains with a series of cutter bars 12 extending therebetween. Each of these cutter bars, as shown more particularly in Figure 6, has a series of circular openings 14, surrounding each of which is an upstanding tubular cutter 16 having a sharpened cutting edge 16a. The cutter belt 10 is trained over two pairs of sprockets 18 and 20 (Figure 1) at the rear and front of the machine respectively. The upper span of the cutter belt 10 between the sprockets 18 and 20 is supported by means of thin tracks 22 adapted to engage the rollers of the chains (see Figure 2), and the lower span of the cutter belt is similarly supported by means of tracks 24.

The cutter belt is driven intermittently through the sprockets 20 by means of a Geneva gear assembly including a star wheel 26 secured upon the same shaft 27 to which sprockets 20 are fixed, and a drive wheel 28. The latter, as may be seen in Figure 2, is secured upon the main drive shaft 30; this shaft 30 extends transversely of the machine and bears near its opposite end a sprocket 32 which is driven through a chain by a suitable motor (not shown). The Geneva gear arrangement is such that, for each cycle of the machine the cutter belt 10 is indexed forward (counter-clockwise as viewed in Figure 1) a distance equal to the spacing of four of the cutter bars 12.

The idler sprockets 18, as shown in Figure 1, are arranged so that their position may be adjusted forwardly or rearwardly of the machine to achieve proper tension of the cutter belt 10.

In operation of the machine, a continuous sheet of dough, of a width generally equaling the width of the cutter belt 10 and of a thickness generally equaling the desired thickness of the biscuit blanks, is fed upon the cutter belt at a rate equal to the average linear speed of the cutter belt.

Rotatably mounted above the cutter belt 10 is a cylindrical roller 34, so positioned that the bottom of the roller 34 engages the cutting edges 16a of the cutters 16 on the belt. As the cutter belt moves past the roller 34, the latter presses the sheet of dough downwardly onto the cutters 16, so that within each of the cutters 16 is formed a circular body or blank of dough. The portion of the sheet of dough between the cutters becomes "scrap" which may be kneaded and used again in the machine.

In practice it has been found advantageous to furnish a positive drive for the roller 34 rather than to depend merely upon the friction of the roller with the cutter belt. This is accomplished (see Figure 3) in the machine shown by means of a sprocket 36 secured to the same shaft 38 upon which the roller 34 is fixed. The sprocket 36 is driven through chain 40 (Figure 1), sprocket 42, shaft 44, sprocket 46, chain 48, sprocket 50, shaft 52, and spur gears 54 and 56 (see Figure 2). The latter gear 56 is secured to the same shaft 27 upon which the drive sprockets 26 for the cutter belt 10 are mounted. Thus, the cylinder 34 is driven intermittently in exact step with the cutter belt.

As the cutter belt moves forward from the position 144 (Figure 1) at which the biscuit blanks are formed within the cutters 16, these blanks are carried into position at 146 over four rows of containers or cans 60 which are positioned beneath the upper span of the cutter belt on a conveyor indicated generally at 62, and extending transversely of the cutter belt 10. The biscuit blanks are pressed from the cutters 16 of the cutter belt 10 into the cans 60 by means of plungers 64 (see Figures 2 and 4). There are four rows of these plungers 64, each row containing as many plungers as there are cutters 16 in each of the bars 12 of the cutter belt; in the particular machine illustrated, there are ten cutters per cutter bar and ten plungers per row. Referring to Figure 5, the plungers 64 are mounted on a cross head 66 which is slidably supported at either side of the machine in ways 68. A vertical reciprocatory movement is imparted to the cross head 66 and plungers 64 by means of a crank shaft 70 having near its opposite ends a pair of counter-weighted cranks indicated generally at 72; these are connected by means of connecting rods 74 to a wrist rod 76, which is journaled at each end in the cross head 66. Crank shaft 70 is driven by means of a pair of mutilated gears 78 and 80 (see Figure 3). The latter gear 80 is secured to the same shaft 82 upon which is fixed a spur gear 84 (see Figure 2); this engages a similar spur gear 86 which is fixed upon the main drive shaft 30. The mutilated gears 78 and 80 are so formed and arranged that during each revolution of gear 80—i. e., one cycle of the machine—the gear 78 and crank shaft 70 are idled for a substantial fraction of the cycle, then are driven rapidly through one revolution to reciprocate plungers 64 downwardly through the cutters 16 and back again. This stroke of the plungers is timed relatively to the other operations of the machine so as to take place in the portion of the cycle in which the cutter belt 10 is at rest.

The cans 60 are supported upon the conveyor 62 by means of cups 88 on bars 90 extending between roller chains 92 at either side of the conveyor. These chains are trained upon three pairs of idler sprockets 94, 96, and 98, and a pair of drive sprockets 100 (see Figure 2). The latter are driven by means of a Geneva gear assembly comprising a star wheel 102 secured to the same shaft 104 on which the drive sprockets 100 are mounted, and a drive wheel 106. The drive wheel 106 is driven by means of a shaft 108, spur gears 110 and 112, a shaft 114 and miter gears 116 and 118. The latter gear 118 is secured to the main drive shaft 30. The Geneva gear arrangement is such that the conveyor belt 62 is indexed counter-clockwise, as viewed in Figure 2, a distance equal to the spacing of adjacent cans in the same row once each cycle of the machine. This movement is timed to take place during the portion of the machine cycle when the plungers 64 are at rest.

It will be understood from the foregoing that for each stroke of the plungers 64 a biscuit blank is placed in each of the cans which are then in position below the cutter belt 10. The cans are intermittently driven transversely of the cutter belt 10 so that each can, in its course across the cutter belt, receives a total of ten biscuit blanks. As shown in Figures 2 and 5, the plungers 64 are of graduated lengths so that as the cans are filled in their movement across the cutter belt, the biscuit blanks are carried to successively higher positions within the cans.

In order to hold the biscuit blanks against the ends of the plungers, and prevent their falling and perhaps turning crosswise in the cans, the plungers are connected to a source of pneumatic vacuum during their downward strokes. Turning to Figure 4, to this end each of the plunger heads 64a is hollow and its interior communicates with the hollow shank 64b of the plunger. The upper ends of the shanks 64b above the cross head 66 are connected to pipes 120 which extend forwardly and rearwardly, each being connected to four of the plungers 64. The forward end of each of these pipes 120 is connected to a flexible hose 122 which extends forwardly and upwardly and is connected through piping 124 to a common manifold 126 extending transversely of the machine. The manifold 126 is connected through a pipe 128 with a source of pneumatic vacuum, such as a vacuum pump and tank (not shown).

In each of the pipes 124 between the manifold 126 and the plungers 64 there is connected a solenoid operated valve 130 which is operable to open or close the connection between the source of vacuum and the plungers. The solenoids of these valves 130 are controlled by means of switches 132 (Figures 2 and 4) which, in turn, are actuated by cams 134 secured upon the shaft 82; this shaft, as may be recalled, is driven continuously and makes one revolution for each machine cycle. The cams 134 are adapted to actuate the switches 132 to open the solenoid valves 130 and connect the source of vacuum to the plungers 64 during the downward stroke of the plungers. The lower faces of the plunger head 64a are provided with openings 64c so that when the plungers are connected to the source of vacuum, a suction is created which tends to hold the biscuit blanks against the plunger heads during the downward stroke of the plungers. As will be appreciated, due to the difference in lengths of the plungers 64, the plungers at the right-hand side of the machine (as viewed in Figures 2 and 5) will make contact with their respective biscuit blanks before the plungers at the left-hand side of the machine. Accordingly, the cams 134 which control the application of vacuum to the plungers at the left-hand side of the machine are formed and arranged so as to actuate the solenoid valves 130 and connect these plungers to the source of vacuum slightly after the right-hand plungers have been connected. Thus each plunger is connected to the source of vacuum at or just prior to the time when it makes contact with its respective biscuit blank, so as to minimize the expenditure of the vacuum.

It has been found that a suction at the faces of the plungers sufficient to support a biscuit blank tends to draw the soft biscuit blanks slightly up into the openings 64c in the faces of the plungers to form projecting tips which are apt to cause the biscuit blanks to stick to the plungers even after the source of vacuum is disconnected from them. In order to insure that the biscuit blanks are readily released by the plungers when the plungers reach the lower extremity of their stroke, means are provided to connect the blanks briefly to a source of pneumatic pressure at the instant the plungers reach their bottom position. To this end, the pipes 120 which communicate with the plungers are also connected through flexible hoses 136 (Figure 4) to a manifold 138 extending transversely of the machine. The manifold 138 is connected through a solenoid operated valve 140 and a pipe 142 (Figure 1) to a source of pneumatic pressure (not shown).

Referring to Figure 2, the solenoid of valve 140 is controlled by a switch 144 which in turn is operated by a cam 146 on shaft 82. Cam 146 is so designed as to cause valve 140 to open and connect the plungers 64 to the source of pressure momentarily at the instant the plungers reach the bottom of their stroke. Since all of the plungers reach this point simultaneously, one solenoid valve and one cam and switch are sufficient to control the proper application of pressure to the plungers.

In order to hold the biscuit blanks within the open tubular cutters 16 during the movement of the cutter belt 10 from the point 144 (Figure 1) at which the biscuit blanks are formed within the cutters by the action of the cylinder 34 to the point 146 at which the blanks are pressed by the plungers from the cutters into the cans 60, four discontinuities or notches 16b (see Figure 6) are provided in the cutting edge 16a of each of the cutters 16. This leaves each of the biscuit blanks connected to the remainder of the sheet of dough by the ligaments or portions of dough in the notches, which portions are left uncut by the cutting edges 16a. When the plungers 64 make contact with the biscuit blanks, however, and press them downwardly these ligaments of dough are readily severed to free the biscuit blanks and allow them to move downwardly into the cans.

As many possible embodiments may be made of the above invention, and as many changes may be made in the embodiment above set forth, it is to be understood that all matter hereinbefore set forth or shown in the accompanying drawings is to be interpreted as illustrative only and not in a limiting sense.

We claim:

1. A machine for forming and packing blanks of dough comprising a movable carrier adapted to support a sheet of dough and having a plurality of openings arranged in generally longitudinal and transverse rows, means for driving said carrier intermittently, a support for containers extending generally transversely of said carrier on the side of said carrier opposite to that upon which said sheet of dough is supported and adapted to support at least one transverse row of containers in line with the openings in an equal number of transverse rows of said openings, a plunger assembly mounted adjacent said carrier on the same side as that upon which said sheet of dough is supported and having a plurality of plungers aligned with the openings in said transverse rows, means for driving said plunger assembly relatively to said carrier and to said support during the intervals when said carrier is stationary to cause said plungers to pass through said openings and press blanks of dough from said sheet through said openings into said containers so that said containers may be moved incrementally across said machine to receive a number of said blanks, with said plungers and said carrier being so arranged that the minimum spacing between the adjacent end of the plunger and the bottom of the containers is graduated from one side of the machine to the other whereby as said containers are moved transversely of said machine and receive a number of said blanks, said plungers carry said blanks to successively higher positions within said containers.

2. A machine for forming and packing blanks of dough comprising a movable carrier adapted to support a sheet of dough and having a plurality of openings arranged in generally longitudinal and transverse rows, means for driving said carrier intermittently, a support for containers extending generally transversely of said carrier beneath the portion thereof upon which said sheet of dough is to be supported, and so dimensioned and positioned as to be capable of supporting one or more transverse rows of containers in line beneath the openings in an equal number of transverse rows of said openings, a plunger assembly mounted above said carrier opposite said support for vertical reciprocation and having a plurality of plungers aligned with the openings in said transverse rows, means for driving said plunger assembly to move said plungers through said openings to stamp blanks of dough from said sheet and press the same into said containers during the interval when said carrier is stationary, and the lower faces of the plungers in each transverse row being spaced from said support by distances graduated from one side of the machine to the other whereby a container moved transversely of the machine in increments equal to the spacing between an integral number of openings in such transverse row will receive a plurality of dough blanks which will be carried by said plungers to successively higher levels within the container.

3. A machine for cutting and packing blanks of dough comprising a movable cutter assembly with a plurality of upstanding, hollow cutter elements, means for driving said cutter assembly intermittently, a surface cooperating with said cutter assembly to press a sheet of dough thereon into said cutter elements to form blanks of dough within said cutter elements, a movable conveyor for containers extending beneath and generally transversely of said cutter assembly, said conveyor being adapted to support a plurality of containers beneath and in alignment with said cutter elements, means for driving said conveyor intermittently in synchronism with the movement of said cutter assembly, a movable plunger assembly mounted above said cutter assembly opposite said conveyor and having a plurality of plungers aligned with said cutter elements, and means for driving said plunger assembly to move said plungers through said cutter elements to press said blanks of dough therefrom into said containers during the interval when said cutter assembly and said conveyor are stationary, and the lower faces of the transversely spaced plungers being at graduated heights whereby as each container is moved transversely of the machine and receives a succession of dough blanks, the blanks are carried by said plungers to successively higher positions within the containers.

4. A machine for cutting and packing blanks of dough comprising a movable cutter assembly with a plurality of upstanding, hollow cutter elements arranged in transverse rows, means for driving said cutter assembly intermittently, a surface cooperating with said cutter assembly to press a sheet of dough thereon into said cutter elements to form blanks of dough within said cutter elements, a movable conveyor for containers extending beneath and generally transversely of said cutter assembly, said conveyor being adapted to support a plurality of containers beneath and in alignment with said cutter elements, means for driving said conveyor intermittently in synchronism with the movement of said cutter assembly, a movable plunger assembly mounted above said cutter assembly opposite said conveyor and having a plurality of plungers aligned with said cutter elements, and means for driving said plunger assembly to move said plungers through said cutter elements to press said blanks of dough therefrom into said containers during the interval when said cutter assembly and said conveyor are stationary, and the lower ends of the plungers within a transverse row being at heights graduated in increments approximately equalling the thickness of said dough blanks, whereby as each container is moved transversely of said machine and receives a succession of dough blanks, the blanks are pressed to heights within the container depending on the number of dough blanks already in the container.

5. A machine for cutting and packing blanks of dough comprising a movable cutter assembly with a plurality of upstanding, hollow cutter elements arranged in transverse rows, means for driving said cutter assembly intermittently in incremental distances equal to the longitudinal spacing between an integral number of said transverse rows of cutter elements, a surface cooperating with said cutter assembly to press a sheet of dough thereon into said cutter elements to form blanks of dough within said cutter elements, a movable conveyor for containers extending beneath and generally transversely of said cutter assembly, said conveyor being adapted to support a plurality of containers beneath and in alignment with the cutter elements in a number of transverse rows equal to the aforesaid integral number, means for driving said conveyor intermittently in synchronism with the movement of said cutter assembly and in incremental distances equal to the spacing between adjacent cutter elements in said transverse rows, a movable plunger assembly mounted above said cutter assembly opposite said conveyor and having a plurality of plungers aligned with said cutter elements, and means for driving said plunger assembly to move said plungers through said cutter elements to press said blanks of dough therefrom into said containers during the interval when said cutter assembly and said conveyor are stationary, and the lower ends of the plungers within a transverse row being at heights graduated in increments approximately equalling the thickness of said dough blanks, whereby as each container is moved transversely of said machine and receives a succession of dough blanks, the blanks are pressed to heights within the container depending on the number of dough blanks already in the container.

6. A machine for cutting and packing blanks of dough comprising a movable cutter assembly with a plurality of upstanding, hollow cutter elements, means for driving said cutter assembly intermittently, a surface engaging said cutter assembly at a cutting point to press a sheet of dough on said cutter assembly into said cutter elements to form blanks of dough within said cutter elements, a movable conveyor for containers extending beneath and generally transversely of said cutter assembly, said conveyor being adapted to support a plurality of containers beneath and in alignment with said cutter elements at a discharge point spaced from said cutting point at a distance in the direction of movement of said cutter assembly, means to hold said blanks of dough in said cutter elements during the movement of said cutter assembly from said cutting point to said discharge point, means for driving said conveyor intermittently in synchronism with the movement of said cutter assembly, a movable plunger assembly mounted above said cutter assembly opposite said conveyor and having a plurality of plungers aligned with said cutter elements, and means for driving said plunger assembly to move said plungers through said cutter elements to press said blanks of dough therefrom into said containers during the interval when said cutter assembly and said conveyor are stationary, and the lower faces of the transversely spaced plungers being at graduated heights whereby as each container is moved transversely of the machine and receives a succession of dough blanks, the blanks are carried by said plungers to successively higher positions within the containers.

7. The combination as claimed in claim 6 wherein the means for holding said blanks of dough in said cutter elements comprises a plurality of notches in the edge of each of said cutter elements whereby the cutting of said blanks of dough by engagement of said surface with said cutter assembly does not completely sever said blanks of dough from said sheet of dough but leaves them connected by ligaments of uncut dough which may be severed to free said blanks of dough by the pressure of said plungers at said discharge point.

8. A machine for cutting and packing blanks of dough comprising a movable cutter assembly with a plurality of upstanding, hollow cutter elements, means for driving said cutter assembly intermittently, a surface cooperating with said cutter assembly to press a sheet of dough thereon into said cutter elements to form blanks of dough within said cutter elements, a movable conveyor for containers extending beneath and generally transversely of said cutter assembly, said conveyor being adapted to support a plurality of containers beneath and in alignment with said cutter elements, means for driving said conveyor intermittently in synchronism with the movement of said cutter assembly, a movable plunger assembly mounted above said conveyor and having a plurality of hollow plungers with perforated lower faces, said plungers being aligned with said cutter elements, and means for driving said plunger assembly to move said plungers through said cutter elements to press said blanks of dough therefrom into said containers during the interval when said cutter assembly and said conveyor are stationary, a source of pneumatic vacuum and means to connect the same to said hollow plungers during the downward movement of said plunger assembly to exert at the perforated lower faces of said plungers a suction tending to hold said blanks of dough against said plungers, and a source of pneumatic pressure and means to connect the same to said hollow plungers at the completion of said downward movement to exert at the perforated lower faces of said plungers a pressure tending to free said blanks of dough from said plungers and deposit them in said containers.

9. A machine for cutting and packing blanks of dough comprising a movable cutter assembly with a plurality of upstanding, hollow cutter elements, means for driving said cutter assembly intermittently, a surface cooperating with said cutter assembly to press a sheet of dough thereon into said cutter elements to form blanks of dough within said cutter elements, a movable conveyor for containers extending beneath and generally transversely of said cutter assembly, said conveyor being adapted to support a plurality of containers beneath and in alignment with said cutter elements, means for driving said conveyor intermittently in synchronism with the movement of said cutter assembly, a movable plunger assembly mounted above said cutter assembly opposite said conveyor and having a plurality of plungers aligned with said cutter elements, and means for driving said plunger assembly to move said plungers through said cutter elements to press said blanks of dough therefrom into said containers during the interval when said cutter assembly, and said conveyor are stationary, and the lower faces of the transversely spaced plungers being at graduated heights whereby as each container is moved transversely of the machine and receives a succession of dough blanks, the blanks are carried by said plungers to successively higher positions within the containers, a source of pneumatic vacuum and means to connect the same to said hollow plungers during the downward movement of said plunger assembly to exert at the perforated lower faces of said plungers a suction tending to hold said blanks of dough against said plungers, and a source of pneumatic pressure and means to connect the same to said hollow plungers at the completion of said downward movement to exert at the perforated lower faces of said plungers a pressure tending to free said blanks of dough from said plunger and deposit them in said containers.

10. The combination as claimed in claim 3 wherein said cutter assembly includes a plurality of cutter bars each bearing a transverse row of said cutter elements, and the opposite ends of said cutter bars being secured to a pair of endless roller chains.

11. The combination as claimed in claim 3 wherein said surface comprises a cylindrical roller.

12. The combination as claimed in claim 3 wherein said surface is a cylindrical roller and wherein said cylindrical roller is mechanically connected to said cutter assembly for driving said cylindrical roller in synchronism with said cutter assembly and at a peripheral speed equal to the linear speed of said cutter assembly.

LOWELL ARMSTRONG.
LIVELY B. WILLOUGHBY.
ROGERS C. B. MORTON.
HARLAN HOW.

References Cited in the file of this patent

UNITED STATES PATENTS

| Number | Name | Date |
| --- | --- | --- |
| 2,048,156 | Gardner | July 21, 1936 |
| 2,092,786 | Taylor | Sept. 14, 1937 |
| 2,180,349 | Back | Nov. 21, 1939 |
| 2,446,762 | Hauck | Aug. 10, 1948 |
| 2,585,379 | Fulmer | Feb. 12, 1952 |

FOREIGN PATENTS

| Number | Country | Date |
| --- | --- | --- |
| 11,128 | Great Britain | June 30, 1891 |